United States Patent
Zhu et al.

(10) Patent No.: US 10,808,290 B2
(45) Date of Patent: Oct. 20, 2020

(54) CLEAN AND RAPID SMELTING METHOD IN AN ELECTRIC ARC FURNACE WITH FULL SCRAP STEEL

(71) Applicant: University of Science and Technology Beijing, Beijing (CN)

(72) Inventors: Rong Zhu, Beijing (CN); Guangsheng Wei, Beijing (CN); Kai Dong, Beijing (CN); Jingxin Zhao, Beijing (CN); Xuetao Wu, Beijing (CN); Tianping Tang, Beijing (CN); Xueliang Wang, Beijing (CN); Wenhe Wu, Beijing (CN); Shaoyan Hu, Beijing (CN); Yun Wang, Beijing (CN)

(73) Assignee: University of Science and Technology Beijing, Beijing (CN)

( * ) Notice: Subject to any disclaimer, the term of this patent is extended or adjusted under 35 U.S.C. 154(b) by 244 days.

(21) Appl. No.: 16/052,629

(22) Filed: Aug. 2, 2018

(65) Prior Publication Data
US 2019/0048430 A1 Feb. 14, 2019

Related U.S. Application Data

(63) Continuation of application No. PCT/CN2018/074228, filed on Jan. 26, 2018.

(30) Foreign Application Priority Data

Aug. 10, 2017 (CN) .......................... 2017 1 0678453

(51) Int. Cl.
*C21C 7/10* (2006.01)
*C21C 7/064* (2006.01)
(Continued)

(52) U.S. Cl.
CPC .......... *C21C 7/0645* (2013.01); *C21C 5/5264* (2013.01); *C21C 7/0025* (2013.01);
(Continued)

(58) Field of Classification Search
CPC ........ C21C 7/0645; C21C 7/04; C21C 5/5264
See application file for complete search history.

(56) References Cited

U.S. PATENT DOCUMENTS

2019/0048430 A1\* 2/2019 Zhu ....................... C21C 7/0025

FOREIGN PATENT DOCUMENTS

| CN | 1331347 A | 1/2002 |
| CN | 101225454 A | 7/2008 |

(Continued)

*Primary Examiner* — Scott R Kastler
(74) *Attorney, Agent, or Firm* — Bayramoglu Law Offices LLC

(57) ABSTRACT

A clean and rapid smelting method in an electric arc furnace with full scrap steel, is suitable for smelting process of 30-300 t electric arc furnace with full scrap steel. In the smelting process of the electric arc furnace with full scrap steel, different kinds of mediums are injected by an injection lance which is installed inside refractory material of sidewall at the bottom of the electric arc furnace in different stages of smelting. Carburization is utilized in molten pool to accelerate melting down and improve carbon content of the molten pool at the stage of recarburizing and fluxing. A reaction in the molten pool is intensified at the stage of high efficiency dephosphorization and deep denitrogenation, to enhance efficient dephosphorization and deep denitrification of the reaction in the molten pool, thereby accelerating the smelting speed of the electric arc furnace with full scrap steel, improving effect of dephosphorization and denitrification.

4 Claims, 2 Drawing Sheets

(51) Int. Cl.
*C21C 5/52* (2006.01)
*C21C 7/00* (2006.01)
*C21C 7/072* (2006.01)

(52) U.S. Cl.
CPC ...... *C21C 7/072* (2013.01); *C21C 2005/5258* (2013.01); *Y02P 10/143* (2015.11); *Y02P 10/20* (2015.11)

(56) References Cited

FOREIGN PATENT DOCUMENTS

| | | |
|---|---|---|
| CN | 102643951 A | 8/2012 |
| CN | 105803155 A | 7/2016 |
| CN | 107502702 A | 12/2017 |
| JP | 2015232157 A | 12/2015 |
| KR | 20090073980 A | 7/2009 |
| KR | 20160048409 A | 5/2016 |

\* cited by examiner

CLEAN AND RAPID SMELTING METHOD IN AN ELECTRIC ARC FURNACE WITH FULL SCRAP STEEL

CROSS-REFERENCE TO RELATED APPLICATIONS

This application is a continuation of International Patent Application No. PCT/CN2018/074228 with a filing date of Jan. 26, 2018, designating the United States, now pending, and further claims priority to Chinese Patent Application No. 201710678453.3 with a filing date of Aug. 10, 2017. The content of the aforementioned applications, including any intervening amendments thereto, are incorporated herein by reference.

TECHNICAL FIELD

The present disclosure belongs to the technical field of electric arc furnace steelmaking, especially relates to a clean and rapid smelting method in an electric arc furnace with full scrap steel.

BACKGROUND

When smelting is conducted by using burden design of full scrap steel in an electric arc furnace, a main input is electric energy input and an auxiliary input is chemical energy input at an early stage of smelting. However, the efficiency of energy utilization is limited when merely a high power of electric energy and chemical energy is inputted. In addition, a molten pool formed in the melting stage of scrap steel is viscous and has poor fluidity, which is not conducive to accelerate the melting of scrap steel. Therefore, in practice, the melt-down time is long in the process of smelting full scrap steel in an electric arc furnace, which greatly reduces the smelting speed of electric arc furnace.

On the other hand, quality control of molten steel has been a technical problem for a long time for the smelting in an electric arc furnace with full scrap steel, which mainly focuses on the control of phosphorus content and nitrogen content of the molten steel at endpoint.

In the aspect of dephosphorization, when electric arc furnace utilizes burden design of full scrap steel for steelmaking, the source of scrap steel is complex, the content of phosphorus content fluctuates greatly after melting down, the temperature of the molten pool is high after melting down, the carbon content is low, the viscosity of the molten steel is high, the flow speed of the molten pool is slow, the kinetics of dephosphorization is poor, and the dephosphorization is difficult in the smelting process. Conventional smelting in the electric arc furnace usually uses a plurality of slagging and flowing slag operations, resulting in prolonged smelting period, large amount of slag and severe peroxidation of molten steel.

In the aspect of denitrification, while the electric arc furnace with full scrap steel is supplied with high power to intensify melting of scrap steel, the high temperature electric arc produced by electrode discharge can ionize $N_2$ in the air nearby, resulting in a large increase in the ability to absorb nitrogen of molten steel. However, due to the low carbon content of the molten pool after melting down in electric arc furnace with full scrap steel and the lack of oxygen supply, the number of CO bubbles produced in the molten pool is low during the period of decarburization in the later smelting, which make [N] can not be removed effectively in the molten pool. Bottom blowing Ar and stirring can be used to denitrify in the arc furnace, but the flow rate of bottom blowing is low (30-100 NL/min), thus the effect of denitrification is limited. The existing smelting process is basically unable to achieve deep denitrification in electric arc furnace with full scrap steel.

Therefore, how to realize rapid smelting in the electric arc furnace with full scrap steel, effective dephosphorization and denitrification, the production of high quality steel with low phosphorus and low nitrogen, to meet the requirements of low cost, cleaning and fast smelting, has always been the technology bottleneck to be solved for the smelting in the electric arc furnace with full scrap steel.

SUMMARY

For the above problems, a clean and fast smelting method in an electric arc furnace with full scrap steel is provided in the disclosure. According to the smelting process of the electric arc furnace with full scrap steel, time-phased dynamic blowing is performed in turn with different kinds of medium in the molten pool; carburization is utilized to accelerate the melting down and improve carbon content of the molten pool at the early stage of smelting; reaction in the molten pool is intensified at the middle and later stages of smelting to achieve efficient dephosphorization and deep denitrification, thus the smelting speed of the electric arc furnace with full scrap steel is accelerated, the effect of dephosphorization and denitrification is improved, the cleanliness of the molten steel is improved, and the clean and rapid smelting in the electric arc furnace with full scrap steel is realized.

An overall implementation of the disclosure is as follows: provided is a clean and rapid smelting method in an electric arc furnace with full scrap steel, an online dynamic switching for different kinds of medium such as pure gas, carrier gas A-recarburization powder and carrier gas B-dephosphorization powder in injection mode is utilized by an injection lance which is installed inside the refractory material of sidewall at the bottom of the electric arc furnace, to finish the process of blowing in turn below molten steel level of molten pool in different stages of smelting for the different kinds of media, and to satisfy the requirements of clean and rapid smelting in the electric arc furnace with full scrap. In a stage of recarburizing and fluxing, the carrier gas A-recarburization powder is injected into the molten pool to improve the carbon content of the molten pool, and to improve flow velocity of the molten steel that has formed the molten pool; carburization is utilized to accelerate the melting of scrap steel, such that the carbon content of the molten steel in the molten pool reaches to 0.40%-2.0% after completing melting process of scrap steel; in a stage of high efficiency dephosphorization, the carrier gas B-dephosphorization powder is injected into the molten pool to improve kinetic conditions for dephosphorization, and high efficiency dephosphorization in the furnace is achieved by systematic dephosphorization of slag particle in molten state, to make the content of phosphorus in molten steel equal to or less than 0.010%; in a stage of deep denitrogenation, $O_2$ or $O_2$—$CO_2$ gas mixture is injected into the molten pool to intensify decarburization in the molten pool, meanwhile a large number of CO bubbles produced by the metallurgical reaction in molten pool effectively removes [N] in the molten steel; in a stage of smelting endpoint, the carrier gas B-dephosphorization powder is injected to prevent the molten steel from "rephosphorization", then Ar is injected into the molten pool largely, to homogenize the composition and temperature of the molten pool, to finally achieve that the carbon content of the molten steel is equal to or more than 0.10%, the phosphorus content of the molten steel is equal to or less than $40*10^{-6}$, and the nitrogen content of the molten steel is equal to or less than $50*10^{-6}$.

The equipments used in the disclosure include a control system, a gas supply control valve group, a carrier gas A-recarburization powder injection system, a carrier gas B-dephosphorization powder injection system, a transmission pipeline, an automatic shut-off valve for recarburization path, an automatic shut-off valve for dephosphorization path, and an injection lance. The injection lance is installed inside the refractory material of sidewall on the bottom of the electric arc furnace, and the outlet of the injection lance is located 0.3~1.0 m below the molten steel level (distance L1 in FIG. 2), the angle between the outlet of the injection lance and the horizontal plane is 0~60 degree (angle A in FIG. 2). According to the different furnace type and capacity of electric arc furnace, 1~6 injection lance are installed. The number of the installation of the injection lance is determined according to the process requirements for smelting. The design of the injection lance is circular seam casing pipe, and a central pipeline adopts straight pipe nozzle, wherein the inside diameter dimension is 8~20 mm, the wall thickness is 2~6 mm, and the gap of the circular seam is 1~5 mm.

The technical scheme of the disclosure includes the following steps:

step 1: in a time period after outputting steel from the electric arc furnace but prior to adding furnace material, a recarburization path automatic shut-off valve (13 in FIG. 1) is closed by a control system, a dephosphorization path automatic shut-off valve (14 in FIG. 1) is opened by the control system, and injection is performed through a transmission pipeline for dephosphorization (12 in FIG. 1); $N_2$ is injected through a central tube and a circular seam tube of an injection lance, and a flow rate of the central tube is 50~500 $Nm^3/h$, a flow rate of the circular seam tube is 50~200 $Nm^3/h$, so as to prevent the injection lance from blocking and burning;

step 2: a feeding stage of the electric arc furnace: injection is performed continuously through the transmission pipeline for dephosphorization (12 in FIG. 1); $O_2$ is injected by the central tube of the injection lance, and the flow rate is 50~300 $Nm^3/h$; propane or natural gas is injected by the circular seam tube, and the flow rate is 50~200 $Nm^3/h$, which ensures a normal operation of the injection lance in the feeding process;

step 3: a stage of recarburizing and fluxing: carbon powder is injected into the molten pool formed by melting of the scrap steel, to improve the carbon content of the molten pool, and carburization is utilized to accelerate the melting of scrap steel. Following steps are performed: 1) an early stage of melting: the recarburization path automatic shut-off valve (13 in FIG. 1) is opened by the control system, and the dephosphorization path automatic shut-off valve (14 in FIG. 1) is closed by the control system; injection is performed through the transmission pipeline for recarburization (11 in FIG. 1); the mode of the carrier gas A-recarburization powder is performed in the central tube of the injection lance, to accelerate the carburizing and melting of the scrap steel. A shallow molten pool is formed in this stage, so the velocity of powder injection must be controlled to improve the carburizing efficiency, wherein the velocity of powder injection is 1~5 kg/min, and the flow rate of the carrier gas A is 100~300 $Nm^3/h$; propane or natural gas is injected by the circular seam tube of the injection lance, and the flow rate is 50~200 $Nm^3/h$. 2) a middle stage of melting: injection is performed continuously through the transmission pipeline for recarburization (11 in FIG. 1); the mode of carrier gas A-recarburization powder is performed by the central tube of the injection lance; the molten pool has a certain depth in this stage, and the velocity of powder injection is controlled to improve carburizing efficiency, wherein the velocity of powder injection is 5~10 kg/min, the flow rate of the carrier gas A is 200~500 $Nm^3/h$; propane or natural gas is injected by the circular seam tube of the injection lance, and the flow rate is 50~200 $Nm^3/h$. 3) a later stage of melting: injection is performed continuously through the transmission pipeline for recarburization (11 in FIG. 1); the mode of carrier gas A-recarburization powder is performed in the central tube of the injection lance; the molten pool is deep in this stage, and carburizing and stirring are intensified in the molten pool, wherein the velocity of powder injection is 10~20 kg/min, and the flow rate of the carrier gas A is 200~600 $Nm^3/h$; propane or natural gas is injected by the circular seam tube of the injection lance, and the flow rate is 50~200 $Nm^3/h$;

step 4: a stage of pipeline cleaning: pipeline is cleaned by using large flow $N_2$ or $CO_2$; following steps are peformed: the recarburization path automatic shut-off valve (13 in FIG. 1) is opened by the control system, and the dephosphorization path automatic shut-off valve (14 in FIG. 1) is closed by the control system; injection is performed through the transmission pipeline for dephosphorization (12 in FIG. 1); injection of $N_2$ or $CO_2$ by the central tube of the injection lance is controlled to clean the pipeline, wherein the flow rate is 400~600 $Nm^3/h$, the time is 20~30 s;

step 5: a stage of high efficiency dephosphorization: high speed dephosphorized particle-gas flow is injected directly to the molten pool below the molten steel level, to effectively remove phosphorus in the molten steel; following steps are peformed: injection is performed continuously through the transmission pipeline for dephosphorization (12 in FIG. 1); the mode of the carrier gas B-dephosphorization is performed in the central tube of the injection lance, and the carrier gas B and dephosphorization powder are directly input into the molten steel and the stirring ability of the molten pool is intensified, to dephosphorize efficiently, wherein the velocity of powder injection is 10~50 kg/min, and the flow rate of the carrier gas is 100~1000 $Nm^3/h$; propane or natural gas is injected by the circular seam tube of the injection lance, and the flow rate is 50~200 $Nm^3/h$;

step 6: a stage of deep denitrogenation: denitrogenation is performed by intense carbon oxygen reaction inside the molten pool; following steps are performed: injection is performed continuously through the transmission pipeline for dephosphorization (12 in FIG. 1); gas mixture of $O_2$—$CO_2$ is injected to intensify decarburization reaction in the molten pool, and a large number of CO bubbles produced by the reaction is utilized to effectively removes [N] in the molten steel, wherein the flow rate of the central tube is 100~1000 $Nm^3/h$, the volume flow ratio of $CO_2$ in mixture gas can be adjusted in a range of 0~100%; propane or natural gas is injected by the circular seam tube of the injection lance, and the flow rate is 50~200 $Nm^3/h$;

step 7: a stage of smelting endpoint: the molten steel is prevented from "rephosphorization", and denitrogenation is further performed to purify the molten steel;

following steps are performed: 1) injection is performed continuously through the transmission pipeline for dephosphorization (12 in FIG. 1), and the mode of the carrier gas B-dephosphorization is performed by the central tube of the injection lance, to prevent the molten steel from "rephosphorization", wherein the velocity of powder injection is 5~20 kg/min, and the flow rate of the carrier gas is 100~500 Nm³/h; propane or natural gas is injected by the circular seam tube of the injection lance, the flow rate is 50~200 Nm³/h, and the time is 1~5 min; 2) approaching the smelting endpoint and the tapping process of the electric arc furnace, injection is performed continuously through the transmission pipeline for dephosphorization (12 in FIG. 1); Ar is injected through the central tube of the injection lance, to further reduce the nitrogen content of the molten steel, to improve the purity of molten steel, wherein the flow rate is 50~600 Nm³/h; Ar is injected through the circular seam tube of the injection lance, and the flow rate is 50~200 Nm³/h;

step 8: return to step 1 and wait for a next feeding in the furnace.

The medium injected by the central tube of the injection lance has three modes of pure gas, carrier gas A-recarburization powder flow and carrier gas B-dephosphorization powder flow; for the pure gas mode, the pure gas is $N_2$, Ar, $O_2$, $CO_2$ or $O_2$—$CO_2$ gas mixture, and the volume flow rate of $CO_2$ is 0~100%; for the carrier gas A-recarburization powder mode, the carrier gas A is air, $N_2$ or $CO_2$, the recarburization powder is carbon powder or graphite carburant, and particle diameter of the recarburization powder is less than 2.0 mm; for the carrier gas B-dephosphorization powder mode, the carrier gas B is $O_2$ or $O_2$—$CO_2$ gas mixture and the volume flow rate of $CO_2$ is 0~100%, the dephosphorization powder is lime powder or limestone powder and the particle diameter of dephosphorization powder is less than 2.0 mm. The medium injected by the circular seam tube of the injection lance is Propane, natural gas, $N_2$ or Ar. The flow rate of pure gas injected through the central tube of the injection lance, the flow rate and the velocity of powder injection of the carrier gas A-recarburization powder and the carrier gas B-dephosphorized powder, and the flow rate of medium injected through the circular seam tube can be adjusted dynamically.

The scheme of the disclosure is suitable for smelting process of the electric arc furnace for full scrap steel of 30~300 t. According to the disclosure, decarburization powder and dephosphorization powder are directly input into the molten pool in the steelmaking process of the electric arc furnace for full scrap steel; in a stage of recarburizing and fluxing, the carbon content of the molten pool is increased greatly, and carburization is utilized to accelerate the melting; in a stage of high efficiency dephosphorization, effect of dephosphorization is improved significantly; in a stage of deep denitrogenation, a large number of CO bubbles produced by the reaction is utilized to achieve advanced denitrogenation. Thus the content of phosphorus at the endpoint in the electric arc furnace for full scrap steel is controlled stably below $40*10^{-6}$, the nitrogen content is controlled stably below $50*10^{-6}$, the smelting cycle of the electric arc furnace for full scrap steel is shortened by 3~10 min. The cleanliness of molten steel is improved, the quality of the product is improved, the smelting speed is accelerated, and production cost is reduced.

BRIEF DESCRIPTION OF THE DRAWINGS

In FIG. 1 and FIG. 2: 1. control system, 2. gas supply control valve group, 3. carrier gas A-recarburization powder injection system, 4. carrier gas B-dephosphorization powder injection system, 5. gas flow control system 1, 6. carbonization powder storage tank, 7. powder flow control system, 8. gas flow control system 2, 9. dephosphorization powder storage tank, 10. powder flow control system, 11, transmission pipeline for recarburization, 12. transmission pipeline for dephosphorization, 13. automatic shut-off valve for recarburization path, 14. automatic shut-off valve for dephosphorization, 15. Injection lance, 16. electric arc furnace, 17. furnace door, 18. steel-tapping hole, 19. refractory material in furnace wall, 20. slag layer, 21. molten steel level, 22. molten steel.

DETAILED DESCRIPTION

In order to make the purpose, the technical scheme and the advantages of the disclosure more clear, the following detailed description of the disclosure is carried out in combination with the accompanying drawings and the embodiments. It should be understood that the specific embodiments described here are only used to explain the disclosure and are not used to limit the disclosure.

In contrast, the disclosure covers any alternative, modification, equivalent method, and scheme in the essence and scope of the disclosure defined by the claim. Further, in order to make the public better understand the disclosure, the details of the disclosure are described in detail below and some specific details are described in detail. The present disclosure can be fully understood by those skilled in the art without the description of these details.

Figure 1:
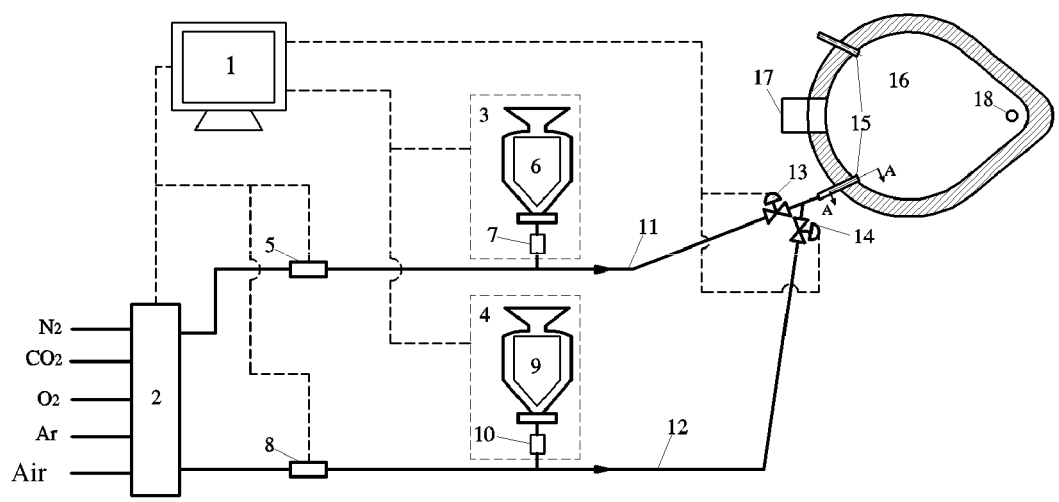
FIG. 1 is a connection diagram of the injection system used in the steelmaking process of an electric arc furnace for full scrap steel in the disclosure.
Figure 2:
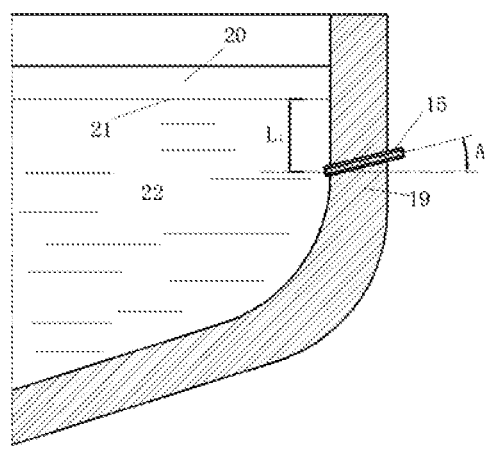
FIG. 2 is a profile diagram for installation of injection lance of an electric arc furnace for full scrap steel in the disclosure (profile A-A, in FIG. 1).
Figure 3:
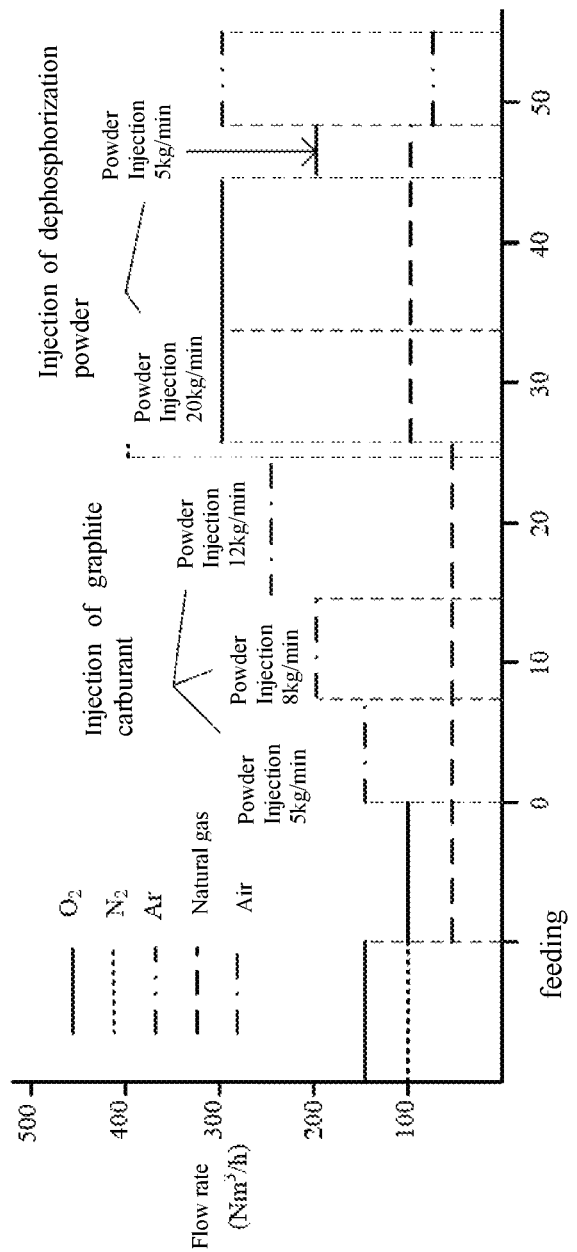
FIG. 3 is a mode chart of injection process of injection lance for clean and rapid smelting in an electric arc furnace for full scrap steel in the disclosure.

Embodiment 1: the scheme is applied to 90 t electric arc furnace steelmaking, with two injection lance distributed at both sides of the electric arc furnace door; wherein the inner diameter of the injection lance is 12 mm, the gap of the circular seam is 1 mm, and stainless steel material is adopted. The outlet of the injection lance is located 800 mm below the molten steel level, and the angle between the outlet of the injection lance and the horizontal plane is 15°. Decarburization powder is graphite carburant, dephosphorization powder is lime powder, particle diameter is 50 μm, the velocity of powder injection of single lance is 0~100 kg/min. The carrier gas A is air, the carrier gas B is oxygen, and the oxygen flow rate of single lance is 50~800 Nm³/h. The gas in circular seam is $N_2$, Ar or natural gas, and the flow rate of single lance is 10~200 Nm³/h. The injection process of the lance is shown in FIG. 3.

12) In a time period after outputting steel from the electric arc furnace but prior to adding furnace material, injection is performed through a transmission pipeline for dephosphorization; $N_2$ is injected through a central tube and a circular seam tube of an injection lance, and a flow rate of the central tube is 150 Nm³/h, a flow rate of the circular seam tube is 100 Nm³/h, so as to prevent the injection lance from blocking and burning.

13) In the feeding process of electric arc furnace, injection is performed continuously through the transmission pipeline for dephosphorization; $O_2$ is injected by the central tube of the injection lance, and the flow rate is 100 Nm³/h; natural gas is injected by the circular seam tube, and the flow rate is 60 Nm³/h, which ensures a normal operation of the injection lance in the feeding process.

14) In 0~7 min after power supply, injection is performed through the transmission pipeline for recarburization; air-graphite carburant is injected by the central tube of the injection lance, the velocity of powder injection is 5 kg/min, and the flow rate of air is 150 $Nm^3/h$; natural gas is injected by the circular seam tube of the injection lance, and the flow rate is 60 $Nm^3/h$.

15) In 8~15 min, injection is performed continuously through the transmission pipeline for recarburization; air-graphite carburant is injected by the central tube of the injection lance, the velocity of powder injection is 8 kg/min, and the flow rate of air is 200 $Nm^3/h$; natural gas is injected by the circular seam tube of the injection lance, and the flow rate is 60 $Nm^3/h$.

16) In 16~25 min, injection is performed continuously through the transmission pipeline for recarburization; air-graphite carburant is injected by the central tube of the injection lance, the velocity of powder injection is 12 kg/min, and the flow rate of air is 250 $Nm^3/h$; natural gas is injected by the circular seam tube of the injection lance, and the flow rate is 60 $Nm^3/h$.

17) Injection is performed through the transmission pipeline for dephosphorization; $N_2$ is injected by the central tube of the injection lance to clean the pipeline, wherein the flow rate is 400 $Nm^3/h$, the time is 20 s.

18) In 26~33 min, injection is performed through the transmission pipeline for dephosphorization; $O_2$-lime powder is injected by the central tube of the injection lance to dephosphorize efficiently, wherein the velocity of powder injection is 20 kg/min, and the flow rate of the carrier gas is 300 $Nm^3/h$; natural gas is injected by the circular seam tube of the injection lance, and the flow rate is 100 $Nm^3/h$;

19) In 34~45 min, injection is performed continuously through the transmission pipeline for dephosphorization; gas mixture of $O_2$—$CO_2$ is injected to intensify decarburization in the molten pool, and a large number of CO bubbles produced by the reaction is utilized to effectively removes [N] in the molten steel, wherein the flow rate of the central tube is 300 $Nm^3/h$, the ratio of $CO_2$ in mixture gas is 30%; natural gas is injected by the circular seam tube of the injection lance, and the flow rate is 100 $Nm^3/h$;

20) In 46~48 min, injection is performed continuously through the transmission pipeline for dephosphorization; oxygen-lime powder is injected by the central tube of the injection lance to dephosphorize efficiently, wherein the velocity of powder injection is 5 kg/min, and the flow rate of the carrier gas is 200 $Nm^3/h$; natural gas is injected by the circular seam tube of the injection lance, and the flow rate is 100 $Nm^3/h$, and the time is 3 min;

21) In 49~55 min, injection is performed continuously through the transmission pipeline for dephosphorization; Ar is injected through the central tube of the injection lance, to further reduce the nitrogen content of the molten steel, and improve the purity of molten steel, wherein the flow rate is 300 $Nm^3/h$; Ar is injected through the circular seam tube of the injection lance, and the flow rate is 100 $Nm^3/h$.

22) At the end of electric arc furnace tapping, return to step 1 and wait for a next feeding in the furnace.

With the method described in the present disclosure, the content of phosphorus in the molten steel smelted in the electric arc furnace is less than 0.003% (mass percent), the nitrogen content is controlled below 0.005% (mass percent), the smelting cycle is shortened by 5 min and the electric energy consumption is reduced by 5 kWh/t. The cleanliness of molten steel is improved, the quality of the product is improved and the smelting speed is accelerated.

Embodiment 2: the scheme is applied to 150 t electric arc furnace steelmaking, with four injection lance distributed evenly at both sides of the electric arc furnace door; wherein the inner diameter of the injection lance is 10 mm, the gap of the circular seam is 1 mm, and stainless steel is adopted as material. The outlet of the injection lance is located 900 mm below the molten steel level, and the angle between the outlet of the injection lance and the horizontal plane is 10°. Decarburization powder is carbon powder, dephosphorization powder is lime powder, particle diameter is 300 μm, the velocity of powder injection of single lance is 0~50 kg/min. The carrier gas A is $N_2$, the carrier gas B is gas mixture of $O_2$—$CO_2$, and the oxygen flow rate of single lance is 50~600 $Nm^3/h$. The gas in circular seam is $N_2$, Ar or propane, and the flow rate of single lance is 10~200 $Nm^3/h$.

12) In a time period after outputting steel from the electric arc furnace but prior to adding furnace material, injection is performed through a transmission pipeline for dephosphorization; $N_2$ is injected through a central tube and a circular seam tube of an injection lance, and a flow rate of the central tube is 100 $Nm^3/h$, a flow rate of the circular seam tube is 50 $Nm^3/h$, so as to prevent the injection lance from blocking and burning.

13) In a feeding process of electric arc furnace, injection is performed continuously through the transmission pipeline for dephosphorization; $O_2$ is injected by the central tube of the injection lance, and the flow rate is 100 $Nm^3/h$; propane is injected by the circular seam tube, and the flow rate is 50 $Nm^3/h$, which ensures a normal operation of the injection lance in the feeding process.

14) In 0~10 min after power supply, injection is performed through the transmission pipeline for recarburization; $N_2$-carbon powder is injected by the central tube of the injection lance, the velocity of powder injection is 5 kg/min, and the flow rate of $N_2$ is 100 $Nm^3/h$; propane is injected by the circular seam tube of the injection lance, and the flow rate is 50 $Nm^3/h$.

15) In 11~15 min, injection is performed continuously through the transmission pipeline for recarburization; $N_2$-carbon powder is injected by the central tube of the injection lance, the velocity of powder injection is 8 kg/min, and the flow rate of $N_2$ is 150 $Nm^3/h$; propane is injected by the circular seam tube of the injection lance, and the flow rate is 50 $Nm^3/h$.

16) In 16~25 min, injection is performed continuously through the transmission pipeline for recarburization; $N_2$-carbon powder is injected by the central tube of the injection lance, the velocity of powder injection is 12 kg/min, and the flow rate of air is 200 $Nm^3/h$; propane is injected by the circular seam tube of the injection lance, and the flow rate is 50 $Nm^3/h$.

17) Injection is performed through the transmission pipeline for dephosphorization; $N_2$ is injected by the central tube of the injection lance to clean the pipeline, wherein the flow rate is 400 $Nm^3/h$, the time is 30 s.

18) In 26~35 min, injection is performed through the transmission pipeline for dephosphorization; $O_2$—$CO_2$-lime powder is injected by the central tube of the injection lance to dephosphorize efficiently, wherein the velocity of powder injection is 15 kg/min, the flow rate of the carrier gas is 300 $Nm^3/h$, and the ratio of $CO_2$ is 20%; propane is injected by the circular seam tube of the injection lance, and the flow rate is 80 $Nm^3/h$.

19) In 36~45 min, injection is performed continuously through the transmission pipeline for dephosphorization; the gas mixture of $O_2$—$CO_2$ is injected to intensify decarburization in the molten pool, and a large number of CO bubbles produced by the reaction is utilized to effectively removes [N] in the molten steel, wherein the flow rate of the central tube is 300 Nm³/h, and the ratio of $CO_2$ in mixture gas is 40%; propane is injected by the circular seam tube of the injection lance, and the flow rate is 80 Nm³/h.

20) In 46~47 min, injection is performed continuously through the transmission pipeline for dephosphorization; $O_2$—$CO_2$-lime powder is injected by the central tube of the injection lance to dephosphorize efficiently, wherein the velocity of powder injection is 5 kg/min, the flow rate of the carrier gas is 200 Nm³/h, and the ratio of $CO_2$ in mixture gas is 20%; propane is injected by the circular seam tube of the injection lance, and the flow rate is 80 Nm³/h, and the time is 2 min.

21) In 48~56 min, injection is performed continuously through the transmission pipeline for dephosphorization; Ar is injected through the central tube of the injection lance, to further reduce the nitrogen content of the molten steel, and improve the purity of molten steel, wherein the flow rate is 200 Nm³/h; Ar is injected through the circular seam tube of the injection lance, and the flow rate is 80 Nm³/h.

22) At the end of electric arc furnace tapping, return to step 1 and wait for a next feeding in the furnace.

After using the method described in the present disclosure, the content of phosphorus in the molten steel smelted in the electric arc furnace is less than 0.004% (mass percent), the nitrogen content is controlled below 0.005% (mass percent), the smelting cycle is shortened by 4 min and the electric energy consumption is reduced by 10 kWh/t. The cleanliness of molten steel is improved, the quality of the product is improved and the smelting speed is accelerated.

What is claimed is:

1. A clean and rapid smelting method in an electric arc furnace with full scrap steel, wherein
online dynamic switching for different mediums including a pure gas, a carrier gas A with a recarburization powder, a carrier gas B with a dephosphorization powder in an injection mode is utilized, to finish a process of blowing in turn below a molten steel level of a molten pool in different stages of smelting for the different mediums;
the process of blowing in turn comprises:
in a stage of recarburizing and fluxing, injecting the carrier gas A with the recarburization powder into the molten pool to improve a carbon content of molten steel in the molten pool, and to improve a flow velocity of the molten steel, wherein the molten steel has formed the molten pool, and accelerating a melting process of the full scrap steel by carburization, wherein the carbon content of the molten steel in the molten pool reaches 0.40%-2.0% after the melting process of the full scrap steel is completed;
in a stage of high efficiency dephosphorization, injecting the carrier gas B with the dephosphorization powder into the molten pool to improve kinetic conditions for the high efficiency dephosphorization, wherein the high efficiency dephosphorization in the electric arc furnace is achieved by systematic dephosphorization of slag particles in a molten state, to make a phosphorus content of the molten steel equal to or less than 0.010%;
in a stage of deep denitrogenation, injecting $O_2$ or a gas mixture of $O_2$ and $CO_2$ into the molten pool to intensify decarburization in the molten pool, and effectively removing nitrogen in the molten steel by a large number of CO bubbles produced by a metallurgical reaction in the molten pool; and
in a stage of a smelting endpoint, injecting the carrier gas B with the dephosphorization powder to prevent the molten steel from rephosphorization, then Ar into the molten pool, to homogenize compositions and a temperature of the molten pool, wherein the carbon content of the molten steel is equal to or more than 0.10%, the phosphorus content of the molten steel is equal to or less than 0.004%, and a nitrogen content of the molten steel is equal to or less than 0.005%;
wherein the online dynamic switching refers to that the switching between the mediums is controlled by a control system and is performed according to the different stages, wherein the word online in the online dynamic switching refers to that the switching between the mediums is controlled by a control system, and the word dynamic in the online dynamic switching refers to that the switching between the mediums is performed according to the different stages.

2. The clean and rapid smelting method in an electric arc furnace with full scrap steel according to claim 1, comprising the following steps:
step 1: in a time period after steel is output from the electric arc furnace and before a furnace material is added, closing a recarburization path automatic shut-off valve by the control system, opening a dephosphorization path automatic shut-off valve by the control system, through a first transmission pipeline for the high efficiency dephosphorization, injecting $N_2$ through a central tube and a circular seam tube of an injection lance, wherein a flow rate of the central tube is 50-500 Nm³/h, and a flow rate of the circular seam tube is 50-200 Nm³/h, to prevent the injection lance from blocking and burning;
step 2: in a feeding stage of the electric arc furnace: through the first transmission pipeline for the high efficiency dephosphorization, injecting $O_2$ by the central tube of the injection lance, wherein a flow rate of the central tube is 50-300 Nm³/h; injecting propane or natural gas by the circular seam tube, wherein a flow rate of the circular seam tube is 50-200 Nm³/h, to ensure a normal operation of the injection lance in the feeding stage of the electric arc furnace;
step 3: in the stage of recarburizing and fluxing: injecting carbon powder into the molten pool formed by the melting process of the full scrap steel, to improve the carbon content of the molten steel in the molten pool, and accelerate the melting process of the full scrap steel by using the carburization, wherein this step comprises the following steps:
1) in an early stage of the melting process: opening the recarburization path automatic shut-off valve by the control system, and closing the dephosphorization path automatic shut-off valve by the control system; through a second transmission pipeline for recarburization, performing a carrier gas A with recarburization powder flow mode on the central tube of the injection lance, to accelerate the carburizing and the melting process of the full scrap steel, wherein the molten pool is formed in the stage, a velocity of a powder injection is controlled to improve a carburizing efficiency, a velocity of the powder injection is 1-5 kg/min, and a flow rate of the carrier gas A is 100-300 Nm³/h; and injecting propane or natural gas by the circular seam tube of the injection lance, wherein a flow rate of the propane or the natural gas is 50-200 Nm³/h;
2) in a middle stage of the melting process: through the second transmission pipeline for the recarburization, performing the carrier gas A-recarburization powder flow mode on the central tube of the injection lance, wherein the molten pool has a depth in the middle stage of the melting process, and a velocity of the powder injection is controlled to improve the carburizing efficiency, wherein a velocity of the powder injection is 5-10 kg/min, and a flow rate of the carrier gas A is 200-500 Nm$^3$/h; and injecting propane or natural gas by the circular seam tube of the injection lance, and a flow rate of the propane or the natural gas is 50-200 Nm$^3$/h; and 3) in a later stage of the melting process: through the second transmission pipeline for the recarburization, performing the carrier gas A-recarburization powder flow mode on the central tube of the injection lance, wherein the molten pool is deep in the later stage of the melting process, and intensifying the carburizing and stirring in the molten pool, wherein a velocity of the powder injection is 10-20 kg/min, and a flow rate of the carrier gas A is 200-600 Nm$^3$/h; and injecting propane or natural gas by the circular seam tube of the injection lance, wherein a flow rate of the propane or the natural gas is 50-200 Nm$^3$/h;

step 4: in a stage of pipeline cleaning: performing pipeline cleaning by using a large flow of N$_2$ or CO$_2$, wherein the pipe cleaning comprise the steps of: opening the recarburization path automatic shut-off valve by the control system, and closing the dephosphorization path automatic shut-off valve by the control system; through the transmission pipeline for the high efficiency dephosphorization, injecting N$_2$ or CO$_2$ by controlling the central tube of the injection lance to perform the pipeline cleaning, wherein a flow rate of the N$_2$ or the CO$_2$ is 400-600 Nm$^3$/h, and a time of injecting the N$_2$ or the CO$_2$ is 20-30 s;

step 5: in the stage of the high efficiency dephosphorization: injecting high speed dephosphorization powder gas flow directly to the molten pool below the molten steel level, to effectively remove phosphorus in the molten steel, wherein this step comprises the following steps: through the first transmission pipeline for the high efficiency dephosphorization, performing a carrier gas B-dephosphorization powder flow mode on the central tube of the injection lance, and inputting the carrier gas B with the dephosphorization powder directly into the molten steel and intensifying a stirring ability of the molten pool, to dephosphorize efficiently, wherein a velocity of the powder injection is 10-50 kg/mm, and a flow rate of the carrier gas B is 100-1000 Nm$^3$/h; and injecting propane or natural gas by the circular seam tube of the injection lance, wherein a flow rate of the propane or the natural gas is 50-200 Nm$^3$/h;

step 6: in a stage of deep denitrogenation: performing the deep denitrogenation by an intense carbon oxygen reaction inside the molten pool, wherein this step comprises the following steps: through the first transmission pipeline for the high efficiency dephosphorization, injecting a gas mixture of O$_2$ and CO$_2$ to intensify the decarburization in the molten pool, and using a large number of CO bubbles produced by the intense carbon oxygen reaction to effectively remove nitrogen in the molten steel, wherein a flow rate of the central tube is 100-1000 Nm$^3$/h, and a volume flow rate of CO$_2$ in the mixture gas is adjusted within a range of 0-100%; and injecting propane or natural gas by the circular seam tube of the injection lance, wherein a flow rate of the propane or the natural gas is 50-200 Nm$^3$/h;

step 7: in the stage of the smelting endpoint preventing the molten steel from rephosphorization, and further performing the denitrogenation to purify the molten steel, wherein this step comprises the following steps: 1) through the first transmission pipeline for the high efficiency dephosphorization, performing the carrier gas B-dephosphorization powder flow mode on the central tube of the injection lance, to prevent the molten steel from rephosphorization, wherein a velocity of the powder injection is 5-20 kg/min, and a flow rate of the carrier gas B is 100-500 Nm$^3$/h; and injecting propane or natural gas by the circular seam tube of the injection lance, wherein a flow rate of the propane or the natural gas is 50-200 Nm$^3$/h, and a time of injecting the propane or the natural gas is 1-5 min; and 2) when the smelting endpoint and a tapping process of the electric arc furnace are approaching, through the first transmission pipeline for the high efficiency dephosphorization, injecting Ar through the central tube of the injection lance, to further reduce the nitrogen content of the molten steel, to improve purity of the molten steel, wherein a first flow rate of Ar is 50-600 Nm$^3$/h; and injecting Ar through the circular seam tube of the injection lance, wherein a second flow rate of Ar is 50-200 Nm$^3$/h; and step 8: returning to the step 1 and waiting for next feeding in the electric arc furnace.

3. The clean and rapid smelting method in an electric arc furnace with full scrap steel according to claim 2, wherein the mediums injected by the central tube of the injection lance have three modes, wherein the three modes include a pure gas mode, a carrier gas A-recarburization powder flow mode and a carrier gas B-dephosphorization powder flow mode; in the pure gas mode, the pure gas is N$_2$, Ar, O$_2$, CO$_2$ or a gas mixture of O$_2$ and CO$_2$, and a volume flow rate of the CO$_2$ is 0-100%; in the carrier gas A-recarburization powder flow mode, the carrier gas A is air, N$_2$ or CO$_2$, the recarburization powder is carbon powder or graphite carburant, and a particle diameter of the recarburization powder is less than 2.0 mm; and in the carrier gas B-dephosphorization powder flow mode, the carrier gas B is O$_2$ or a gas mixture of O$_2$ and CO$_2$, a volume flow rate of CO$_2$ is 0-100%, the dephosphorization powder is lime powder or limestone powder, and a particle diameter of the dephosphorization powder is less than 2.0 mm.

4. The clean and rapid smelting method in an electric arc furnace with full scrap steel according to claim 2, wherein the full scrap steel is a full scrap steel of 30-300 t.

* * * * *